US008460572B2

(12) United States Patent

Boluk et al.

(10) Patent No.: US 8,460,572 B2
(45) Date of Patent: *Jun. 11, 2013

(54) AIRCRAFT ANTI-ICING FLUIDS FORMULATED WITH NANOCRYSTALLINE CELLULOSE

(75) Inventors: Yaman Boluk, Edmonton (CA); Liyan Zhao, Edmonton (CA)

(73) Assignee: Alberta Innovates-Technology Futures, Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/380,085

(22) PCT Filed: Jun. 25, 2010

(86) PCT No.: PCT/CA2010/000933

§ 371 (c)(1),
(2), (4) Date: Mar. 6, 2012

(87) PCT Pub. No.: WO2011/000081

PCT Pub. Date: Jan. 6, 2011

(65) Prior Publication Data

US 2012/0153214 A1 Jun. 21, 2012

Related U.S. Application Data

(63) Continuation-in-part of application No. 12/495,659, filed on Jun. 30, 2009, now Pat. No. 8,105,430.

(51) Int. Cl.
*C09K 3/18* (2006.01)
*C08L 1/02* (2006.01)
*C08L 1/28* (2006.01)
*B64D 15/02* (2006.01)

(52) U.S. Cl.
USPC ....... 252/70; 106/13; 106/165.01; 106/203.1; 106/205.1; 524/35

(58) Field of Classification Search
USPC ......... 106/13, 165.01, 203.1, 205.01; 252/70; 524/35
See application file for complete search history.

(56) References Cited

U.S. PATENT DOCUMENTS 8,105,430 B2 * 1/2012 Boluk et al. ............ 106/163.01

* cited by examiner

*Primary Examiner* — Anthony J Green
(74) *Attorney, Agent, or Firm* — Geoffrey deKleine; Borden Ladner Gervais LLP

(57) ABSTRACT

An aircraft anti-icing composition is provided comprising a freezing point depressant and a thickener comprising nanocrystalline cellulose. A thickening composition is also provided comprising nanocrystalline cellulose. Also taught is the use of nanocrystalline cellulose in the manufacture of an anti-icing composition and the use of nanocrystalline cellulose in a thickening composition.

33 Claims, 3 Drawing Sheets

AIRCRAFT ANTI-ICING FLUIDS FORMULATED WITH NANOCRYSTALLINE CELLULOSE

CROSS REFERENCE TO RELATED APPLICATIONS

This application is a 371 of PCT/CA2010/000933 filed Jun. 25, 2010, which is a CIP of U.S. Ser. No. 12/495,659 filed Jun. 30, 2009, now U.S. Pat. No. 8,105,430.

FIELD OF THE INVENTION

This application relates to aircraft anti-icing fluids formulated with nanocrystalline cellulose and their applications.

BACKGROUND OF THE INVENTION

Regulations established by the U.S. Federal Aviation Administration (FAA), Transport Canada and other international counterparts prohibit the takeoff of any aircraft when frost, ice or snow is adhered to aircraft wings, propellers or control surfaces. Regulations also prohibit takeoff at any time that frost, ice or snow can reasonably be expected to adhere to the aircraft, unless the operator has an approved de-icing or anti-icing program.

Common practice developed in North American and European aviation communities is to de-ice the accumulated snow and other freezing precipitates followed by anti-icing the aircraft before takeoff. The purpose of aircraft de-icing and anti-icing is to keep airplane wings and other aerodynamically sensitive areas clean before and during takeoff.

Aircraft de-icing is performed to clean aircraft surfaces of already accumulated freezing precipitates, by applying heated aircraft de-icing fluids. Commercial de-icing fluids are commonly glycol solutions such as ethylene glycol or propylene glycol water mixtures, which act as freezing point depressants.

Aircraft anti-icing is a preventive procedure which provides protection against the ongoing formation of frost or ice and accumulation of snow or slush on treated surfaces of the aircraft. Aircraft anti-icing is done by applying aircraft anti-icing fluids (AAF) after the aircraft is de-iced. Anti-icing fluids are often glycol solutions thickened with water soluble polymers. The typical concentrations for glycol solutions and water soluble polymers in AAF are 40-95% and 0.1-0.5% by weight, respectively. AAF is usually applied unheated to form a temporary protective layer on aircraft surfaces. The AAF layer has a lower freezing point than the frozen precipitation, which melts upon contact with the anti-icing fluid.

The water soluble polymer thickener keeps the anti-icing fluid from draining off sloped aircraft surfaces. This is important in keeping the aircraft free from precipitation while the aircraft waits for takeoff, without having to repeatedly apply the anti-icing fluid. However, quite often as the fluid layer becomes diluted by melting precipitation, its viscosity drops and the anti-icing fluid layer becomes thinner and less effective and frozen precipitate begins to accumulate.

Conversely, an anti-icing fluid that is too thick will cling to the aircraft surfaces even at high shear rates, such as those seen during takeoff. This can lead to unstable aerodynamics and have a detrimental effect of aircraft lift and balance.

It is therefore extremely important to develop a thickener for aircraft anti-icing fluids that retains thickness and viscosity during low shear conditions, such during taxiing and waiting, but which also shears off easily in high shear conditions, namely at takeoff. Such non-Newtonian fluids should advantageously change viscosity in varying shear conditions.

SUMMARY OF THE INVENTION

The present invention provides an aircraft anti-icing composition comprising a freezing point depressant and a thickener comprising nanocrystalline cellulose.

The present invention also provides a thickening composition comprising a water soluble polymeric thickener and nanocrystalline cellulose.

The present invention further provides for the use of nanocrystalline cellulose in the manufacture of an anti-icing composition.

The present invention additionally provides for the use of nanocrystalline cellulose in a thickening composition.

DESCRIPTION OF THE DRAWINGS

The invention will now be described in further detail with reference to the following drawings, in which.

DETAILED DESCRIPTION OF THE PREFERRED EMBODIMENTS

When describing the present invention, all terms not defined herein have their common art-recognized meanings. As used herein, the term "about" refers to a margin of plus or minus 10%, or within the tolerance of a suitable measuring device or instrument.

There are two important performance characteristics in assessing aircraft anti-icing fluids, namely protection or holdover time against oncoming frozen precipitation and the aerodynamic impact of the anti-icing fluid on aircraft surfaces during takeoff. These are discussed below in further detail.

SAE standards define two requirements for anti-icing performance: a water spray endurance test (WSET) and a high humidity endurance test (HHET), which are carried out in a climatic test chamber.

The rate of precipitation in a WSET is typically 5 g/dm$^2$h, where the air and surface temperatures are set at −5.0° C. The High Humidity Endurance Test (HHET) is representative of frost accumulation, typically during overnight parking. The rate of ice condensation in HHET is typically 0.3 g/dm$^2$h, where the air temperature is set at 0° C., the surface temperature is set at −5° C. and the air humidity is set at 96%.

Figure 1:
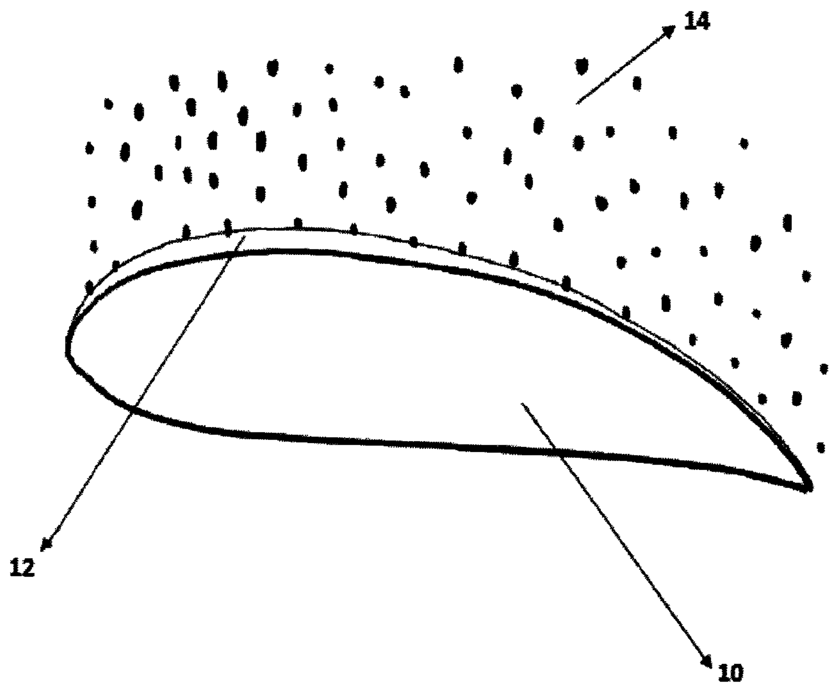
FIG. 1 is a cross-sectional view of an aircraft wing coated with anti-icing fluid, showing the protective layer formed by the anti-icing fluid over the surface of the wing.

The test procedure is similar for both WSET and HHET tests. A film of anti-icing fluid is applied and precipitation is turned on after a 5 minute settling period for the fluid to reach a stable thickness. The time required for the ice to reach a 2.5 cm length is recorded as the standard holdover time for the anti-icing fluid. FIG. 1 illustrates an aircraft wing 10 coated with a layer of anti-icing fluid 12, protecting against frozen precipitation 14.

De-icing and anti-icing fluids remaining on the aircraft wing surfaces must flow off at the time of takeoff, usually by shearing action of airflow. If the fluid viscosity is high and does not shear off at take off speeds, this can adversely affect the aerodynamic performance and lift loss characteristics of the aircraft. Furthermore, at low atmospheric temperatures fluids are generally more viscous, making it more difficult for the fluid to flow off.

As an aircraft gains speed on its take off run, the aerodynamic shear forces cause the fluids to flow off the aircraft's surfaces. The amount of fluid that is sheared off the aircraft depends upon the speeds reached during the take off run and the time it takes to reach those speeds. There are two separate aerodynamic acceptance criteria, one for faster rotation speed aircrafts such as turbo jets and one for slower rotation speed aircrafts such as turbo prop commuters. The objective of the test is to determine the coldest temperature at which the de-icing or anti-icing fluids have acceptable aerodynamic characteristics as they flow off aircraft surfaces during take-off, at ground acceleration and climb.

SAE aerodynamic acceptance criteria for de-icing and anti-icing fluids are based on the measurement of boundary layer displacement thickness (BLDT) on a flat plate in a low temperature wind tunnel. BLDT is directly related to lift loss during aircraft takeoff. During this test, the amount of fluid left in the test section floor is also measured and reported.

In addition to performance characteristics of fluids on the aircraft, they must also have good handling characteristics and their flow properties should not deteriorate during the handling of fluids before and during being sprayed onto aircraft surfaces. Shear stability and thermal stability are thus two important handling characteristics of aircraft anti-icing fluids.

Aircraft anti-icing fluids are pumped from the storage tank to the de-icing truck and sprayed through spray nozzles. This kind of flow generates high shear rates in the anti-icing fluid. High molecular weight polymeric thickeners are inherently sensitive to shear rates and often degrade and permanently lose their thickening and viscosity-increasing characteristics. Naturally if the polymeric thickener in the anti-icing composition degrades, the viscosity drops and the fluid loses its ice protection characteristics. Anti-icing fluid formulations therefore are required not to lose more than 20% of their low shear rate viscosities under controlled test procedure.

Anti-icing fluid formulations are generally applied unheated to obtain maximum coating efficiency on aircraft surfaces. Nevertheless, polymeric thickeners in formulations should not decompose under heat and cause permanent viscosity reduction.

The present invention provides a novel thickener and thickener component in the form of nanocrystalline cellulose.

Cellulose is a natural polymeric material which constitutes wood and agricultural biomass along with hemicellulose and lignin. It is a homopolymer of glucose repeating units which are connected by 1-4 β-glycosidic linkages. The 1-4 β-linkages form cellulose in linear chains, which interact strongly with each other through hydrogen bonds. Because of their regular structure and strong hydrogen bonds, cellulose polymers are highly crystalline and aggregate to form substructures and microfibrils. Microfibrils, in turn aggregate to form cellulosic fibres.

Purified cellulose from wood or agricultural biomass can be extensively disintegrated or produced by bacterial processes. If the cellulosic material is composed of nanosized fibers, and the properties of the material are determined by its nanofiber structure, these polymers are described as nanocelluloses. In general, nanocelluloses are rod shaped fibrils with a length/diameter ratio of approximately 20 to 200. Preferably, the nanocelluloses have a diameter less than about 60 nm, more preferably between about 4 nm to about 15 nm, and a length of about 150 nm to about 350 nm.

Figure 2:
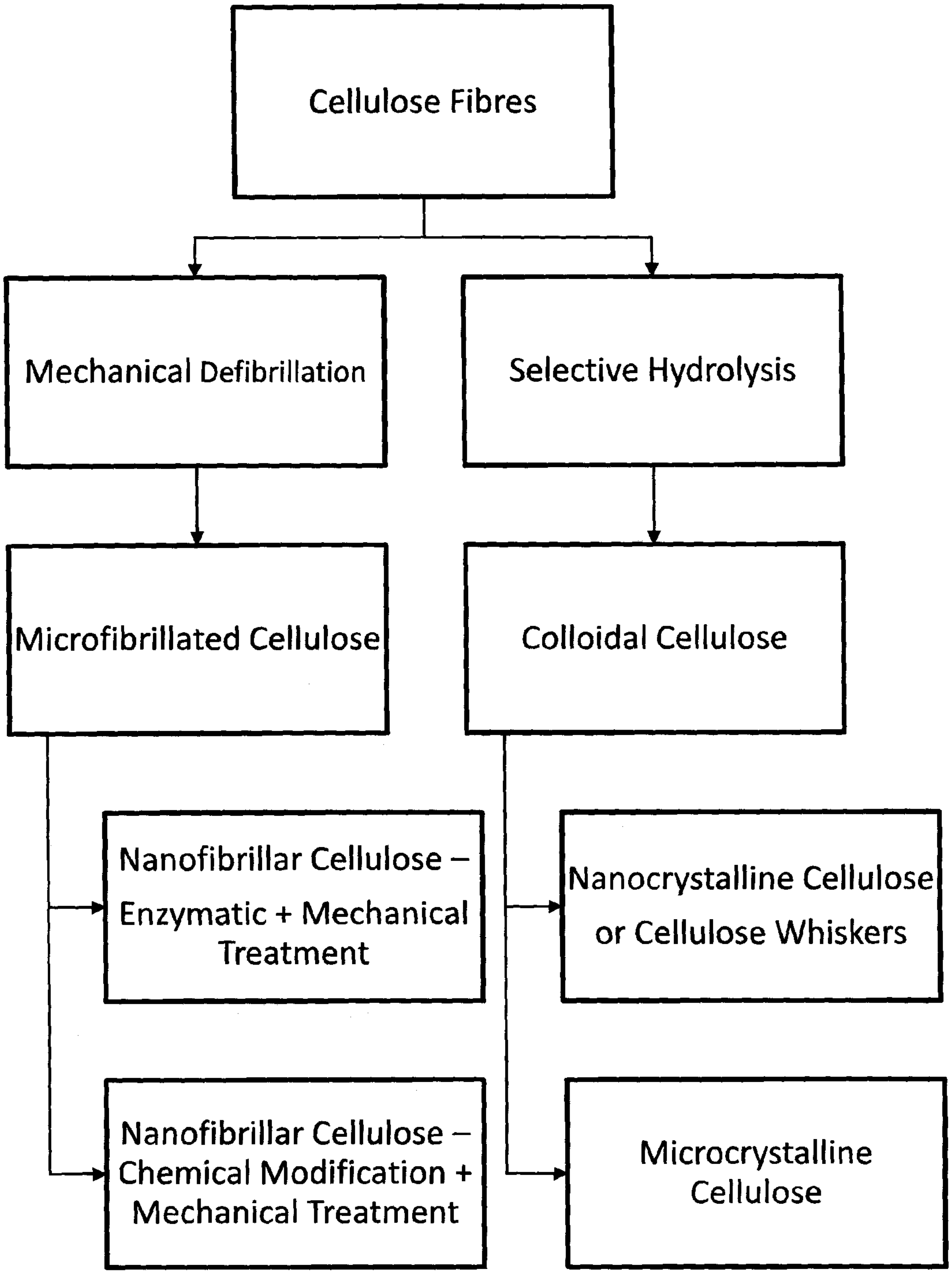
FIG. 2 is a schematic diagram of two preferred methods for making nanocrystalline cellulose of the present invention.

Generally preparation of nanocellulose can be described by two methods, both of which are illustrated in FIG. 2. In the first method, nanocellulose can be prepared from the chemical pulp of wood or agricultural fiber mainly by acid hydrolysis to remove the amorphous regions, which then produce nano-size fibrils. In the final stage individual whiskers or crystallites are produced and stabilized in aqueous suspensions by either sonicating or passing through a high shear micro fluidizer. This kind of prepared material is referred to as nanocrystalline cellulose (NCC), cellulose nanocrystals, cellulose nanofibres or cellulose whiskers.

The second method is primarily a physical treatment. Bundles of microfibrils called cellulose microfibril or microfibrillated cellulose with diameters from tens of nanometers (nm) to micrometers (μm) are generated by using high pressure homogenizing and grinding treatments. A novel process using high-intensity ultrasonication has also been used to isolate fibrils from natural cellulose fibres. High intensity ultrasound can produce very strong mechanical oscillating power, so the separation of cellulose fibrils from biomass is possible by the action of hydrodynamic forces of ultrasound. This method produces a microfibrillated cellulose with a diameter less than about 60 nm, more preferably between about 4 nm to about 15 nm, and a length less then 1000 nm The microfibrillated cellulose can optionally further undergo chemical, enzymatic and/or mechanical treatment.

Nanocrystaline celluloses and microfibrillated celluloses, such as those prepared by the processes described above, have been found to be effective when used as thickening agents, both alone and in thickening compositions with conventional water soluble polymeric thickeners. These thickening compositions can then be combined with well known freezing point depressants and other commonly known additives, to form effective anti-icing compositions.

An ideal rheology modifying system for anti-icing formulations should thicken to form a coating layer on the aircraft surfaces while aircraft is at rest. In addition, the fluid viscosity should not drop abruptly with dilution by result of oncoming freezing rain.

Anti-icing formulations should not flow over the sloped aircraft surfaces under gravity while the aircraft is stationary. The corresponding shear rate of flow for anti-icing fluids on stationary sloped surfaces is between 0.01-0.2 $sec^{-1}$. Therefore the thickening efficiency and anti-icing protection characteristics of a rheology modifier can be evaluated by measuring viscosity at 0.13 $sec^{-1}$, herein defined as low shear rate (LSR). The viscosity at a 0.13 $sec^{-1}$ shear rate is desirably as high as possible, and more preferably greater than 5 Pa·s, to form a thick protection layer of anti-icing fluid on sloped aircraft wing surfaces. In addition, such a high viscosity provides a buffer against layer thinning due to freezing rain dilution.

Figure 3:
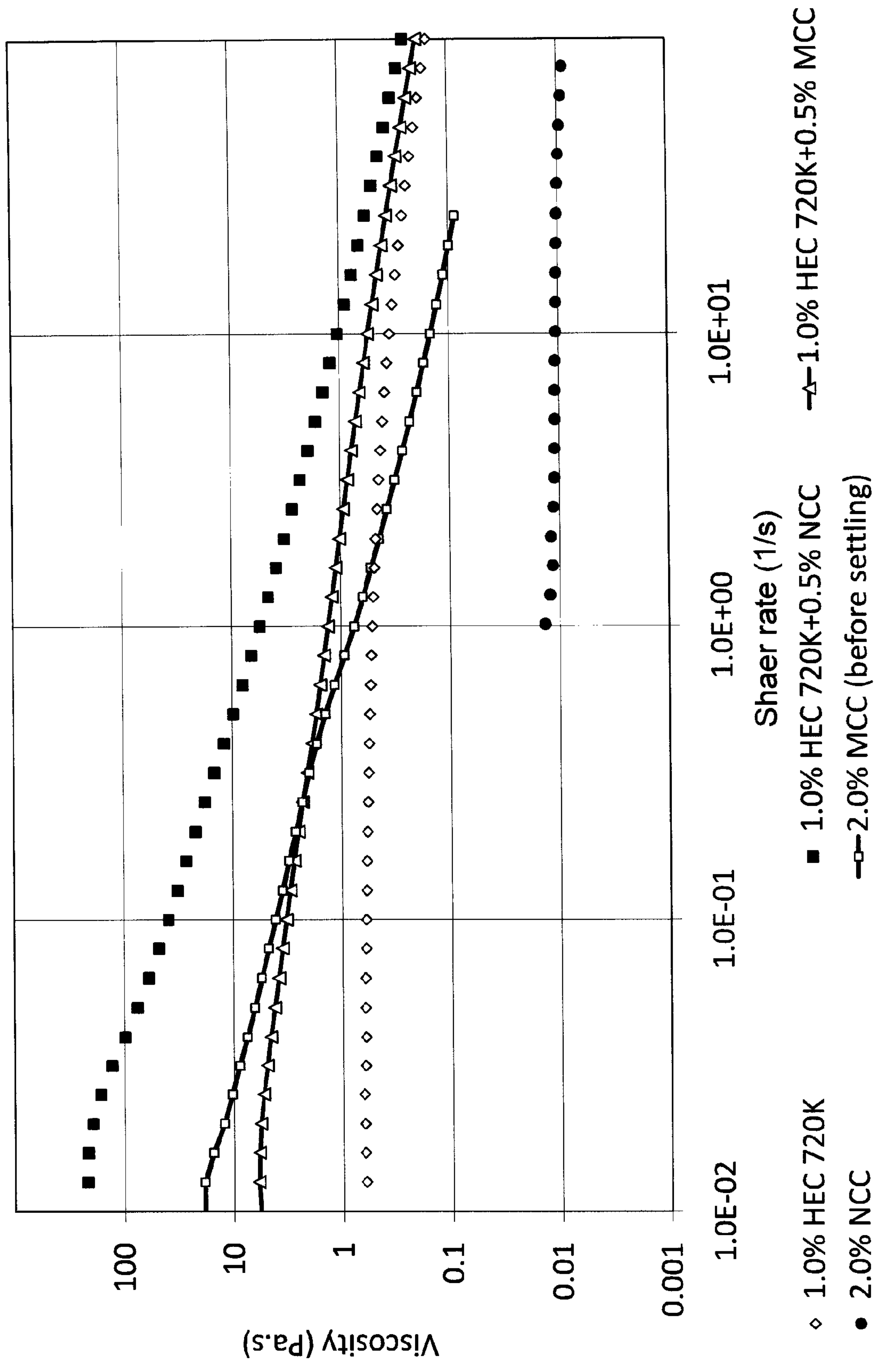
FIG. 3 is a graph showing the viscosity versus shear rate of hydroxyethyl cellulose (HEC) alone, HEC with 0.5% nanocrystalline cellulose (NCC), HEC with 0.5% colloidal microcrystalline (MCC), 2% NCC and 2% MCC.

FIG. 3 shows the viscosity-shear rate relation of five different thickener compositions and illustrates the significantly increased low shear rate viscosity of thickeners comprising NCC. It can be seen that although the low shear viscosity of 2% MCC is higher than 2% NCC, thickeners comprising 0.5% NCC with HEC shows low shear viscosities that are almost two orders of magnitude higher than 0.5% MCC with HEC at the same shear rate.

To minimize the lift loss effects, anti-icing formulations should flow off easily with minimum wave formation at the time of accelerated aircraft speed. The shear rate at flow off corresponds to 10-20 $sec^{-1}$ shear rate range. The anti-icing fluid's viscosity must be low at this shear rate range and should also not increase abruptly with potential temperature drops. To pass the BLDT test, the viscosity at 20 $sec^{-1}$ should not be higher than 0.75 Pa·s. Therefore anti-icing viscosity measured at 20 $sec^{-1}$, herein defined as high shear rate (HSR), can be used to evaluate lift loss and BLDT performance characteristics.

It is hypothesized that the cellulose nanofibers used in the present invention are involved in a hydrogen bonding network forming reversible physical linkages with the polymer strands of common water soluble polymeric thickeners, thereby increasing the viscosity of the thickening composition. The physical linkages differ from chemical bonds between branched polymeric thickeners and from hydrophobic interactions between associative polymer thickeners. The physical linkages are easily broken in high shear conditions, thereby allowing for low viscosities during aircraft takeoff. They then tend to re-form at lower shear rates. This reversible linking provides the desired high viscosity at LSR conditions and low viscosity at HSR conditions that is needed in anti-aircraft icing fluids. It also avoids the damage typically seen to branched polymeric thickeners under high shear conditions.

Water soluble polymeric thickeners that can be used with nanocrystalline cellulose to form the present thickening compositions can include, for example, hydroxyl ethyl cellulose (HEC), hydrophobically modified hydroxyethyl cellulose (HMEC), carboxymethyl cellulose (CMC) crosslinked polyacrylates, carboxypoymethylene, poysaccharides such as xanthan gum, guar gum and carrageenan. The thickening composition is preferably made up of nanocrystalline cellulose in an amount of 0.1 to 1.0% by weight of the thickening composition and one or more polymeric thickeners in an amount of 0.1 to 5.0% by weight of the thickening composition. A most preferred thickening composition is 0.5% by weight nanocrystalline cellulose and 0.2% by weight hydroxyethyl cellulose or other water soluble polymer.

The aircraft anti-icing fluids of the present invention commonly also contain a freezing point depressant. This freezing point depressant can typically be composed of an alkaline glycol solution in water. The glycol component of the anti-icing fluid formulation is preferably at least 40% by weight, more preferably 50 to 95% by weight. The glycol component of AAF is preferably either ethylene glycol or propylene glycol. However, diols such as diethylene glycol, triethylene triol and 1,2-propane diol can also be used. The alkalinity of anti-icing fluids can be controlled by adding, for example, triethylamine (TEA) and/or potassium hydroxide (KOH) to achieve a pH in the range of about 8.5.

The anti-icing composition of the present invention can be made with nanocrystalline cellulose alone as a thickening agent or optionally nanocrystalline cellulose in conjunction with one or more water soluble polymeric thickeners for anti-icing fluids. The nanocrystalline cellulose component is preferably present in an amount of 0.25 to 5% by weight of the anti-icing composition, more preferably 0.25 to 2% by weight of the anti-icing composition. If mixed with one or more polymeric thickeners, the polymeric thickener is preferably present in an amount of 0.1 to 2% by weight of the anti-icing composition, more preferably 0.1 to 0.5% by weight of the composition. The water soluble polymers can be, for example, crosslinked polyacrylates, carboxypoymethylene, poysaccharides such as xanthan gum, guar gum and carrageenan, carboxymethyl cellulose, hydroxyethyl cellulose and hydrophobically modified hydroxyethyl cellulose. A person of skill in the art will understand that other suitable thickeners may also be used in conjunction with the present invention without deviating from its scope.

Surfactants can also optionally be added to improve spraying and wetting ability during application and to control the level of thickening by associating with polymeric rheological modifiers.

In addition, anti-icing fluid formulations may optionally also contain one or more of corrosion inhibitors, anti-foamers, colorants and fire inhibitors.

EXAMPLES

The following examples serve to better illustrate aspects of the present invention, without limiting the scope thereof:

The nanocrystalline cellulose of the present invention was tested as a rheological modifier both alone and in combination with other known thickeners. A generic anti-icing fluid formulation of 50/50 etyhlene glycol/water mixture was used for all examples. The alkalinity of the anti-icing fluid was maintained at pH 8.5 by the addition of triethylamine (TEA) and potassium hydroxide (KOH). Surfactants and other additives could also have been added to the composition, without deviating from the scope of the invention.

Example 1

Thickeners with Hydroxyethyl Cellulose and Nanocrystalline Cellulose

The performance of hydroxyethyl cellulose (HEC) as an anti-icing thickener with and without nanocrystalline cellulose (NCC) was tested to see how the addition of nanocrystalline cellulose affected thickening properties at low shear rates (before takeoff) and high shear rates (during takeoff). Three different molecular weights of HEC were tested. The results are shown in Tables 1, 2 and 3 below:

TABLE 1

Performance of HEC (MW = 250,000) with and without NCC

| Thickener | Temperature (° C.) | Viscosity (Pa · s) at low and high shear rates: at $\gamma$ = 0.13 $s^{-1}$ | at $\gamma$ = 20 $s^{-1}$ |
|---|---|---|---|
| 0.2% HEC | 20 | 0.01 | 0.01 |
| | 0 | 0.04 | 0.03 |
| | −10 | 0.07 | 0.05 |
| | −18 | 0.11 | 0.09 |
| 0.2% HEC + 0.5% NCC | 20 | 0.14 | 0.04 |
| | 0 | 0.45 | 0.09 |
| | −10 | 0.83 | 0.14 |
| | −18 | 1.48 | 0.19 |

TABLE 2

Performance of HEC (MW = 750,000) with and without NCC

| Thickener | Temperature (° C.) | Viscosity (Pa · s) at low and high shear rates: at $\gamma$ = 0.13 $s^{-1}$ | at $\gamma$ = 20 $s^{-1}$ |
|---|---|---|---|
| 0.2% HEC | 20 | 0.02 | 0.02 |
| | 0 | 0.04 | 0.04 |
| | −10 | N/A | N/A |
| | −18 | 0.11 | 0.09 |
| 0.2% HEC + 0.5% NCC | 20 | 4.17 | 0.09 |
| | 0 | 5.19 | 0.15 |
| | −10 | 5.53 | 0.18 |
| | −18 | 6.01 | 0.24 |

TABLE 3

Performance of HEC (MW = 1,300,000) with and without NCC

| Thickener | Temperature (° C.) | Viscosity (Pa · s) at low and high shear rates at γ = 0.13 $s^{-1}$ | at γ = 20 $s^{-1}$ |
|---|---|---|---|
| 0.2% HEC | 20 | 0.05 | 0.04 |
| | 0 | 0.14 | 0.09 |
| | −10 | 0.17 | 0.12 |
| | −18 | 0.30 | 0.17 |
| 0.2% HEC + 0.5% NCC | 20 | 7.17 | 0.17 |
| | 0 | 7.10 | 0.26 |
| | −10 | 11.82 | 0.35 |
| | −18 | 13.19 | 0.40 |

From these tables, it can be seen that the HEC viscosity on its own, at each molecular weight, changes very little from low shear to high shear conditions. The viscosity of HEC at varying molecular weights also changes very little from low shear to high shear conditions. However, with the addition of nanocrystalline cellulose, the low shear viscosity increased in all three cases, and yet the fluid maintained a desirably low viscosity at high shear rates. A higher molecular weight HEC along with addition of NCC also increased the low shear viscosity while maintaining a desirable low viscosity at high shear rates. The addition of nanocrystalline cellulose improved the non-Newtonian characteristics of the thickener. It showed higher viscosities before takeoff, leading to longer holdover time, and lower viscosities at high shear, to reduce aerodynamic lift losses during takeoff. The use of a high molecular weight polymer may also allow for lower concentrations of the water soluble polymer and NCC than is described in the present invention.

Example 2

Thickeners with Hydrophobically Modified Hydroxyethyl Cellulose & Nanocrystalline Cellulose As test similar to Example 1 was carried out, using hydrophobically modified hydroxyethyl cellulose (HMHEC) as the thickener, with and without adding nanocrystalline cellulose. The results of this test are given in Table 4 below.

TABLE 4

Performance of HMHEC (MW = 400,000) with and without NCC

| Thickener | Temperature (° C.) | Viscosity (Pa · s) at low and high shear rates at γ = 0.13 $s^{-1}$ | at γ = 20 $s^{-1}$ |
|---|---|---|---|
| 0.2% HMHEC | 20 | 0.06 | 0.03 |
| | 0 | 0.23 | 0.10 |
| | −10 | 0.40 | 0.14 |
| | −18 | 0.91 | 0.19 |
| 0.2% HMHEC + 0.5% NCC | 20 | 2.62 | 0.10 |
| | 0 | 3.59 | 0.16 |
| | −10 | 4.91 | 0.22 |
| | −18 | 6.83 | 0.28 |

As with HEC, HMEC showed little change in viscosity from low shear to high shear conditions, acting more like a Newtonian fluid. By addition of nanocrystalline cellulose to the thickener, however, the low shear viscosity increased dramatically, providing a much better protection time. The high shear viscosity of the nanocrystalline cellulose-added thickener remained quite low, ensuring little aerodynamic lift loss.

Example 3

Thickeners with Carboxymethyl Cellulose and Nanocrystalline Cellulose

As similar test to Example 1 was carried out, using carboxymethyl cellulose (CMC) as the thickener, with and without the addition of nanocrystalline cellulose. The results are given in Table 5 below.

TABLE 5

Performance of CMC (MW = 250,000) with and without NCC

| Thickener | Temperature (° C.) | Viscosity (Pa · s) at low and high shear rates at γ = 0.13 $s^{-1}$ | at γ = 20 $s^{-1}$ |
|---|---|---|---|
| 0.2.% HMHEC | 20 | 0.01 | 0.02 |
| | 0 | 0.05 | 0.06 |
| | −10 | 0.10 | 0.09 |
| | −18 | 0.16 | 0.14 |
| 0.2% HMHEC + 0.5% NCC | 20 | 5.25 | 0.14 |
| | 0 | 6.70 | 0.22 |
| | −10 | 6.50 | 0.29 |
| | −18 | 5.03 | 0.38 |

As with HEC and HMEC, CMC also showed little change in viscosity from low shear to high shear conditions when used on its own as a thickener. By addition of nanocrystalline cellulose to the thickener however, the low shear viscosity increased dramatically, while the high shear viscosity remained low.

Tables 6, 7 and 8 below show the high and low shear rate viscosities for varying HEC and NCC concentrations.

TABLE 6

Performance of HEC at various concentrations

| Thickener | Temp (° C.) | Viscosity (Pa · s) at at γ = 0.13 $s^{-1}$ | at γ = 20 $s^{-1}$ |
|---|---|---|---|
| 0.2% HEC | 20 | 0.02 | 0.02 |
| | 0 | 0.04 | 0.04 |
| | −10 | N/A | N/A |
| | −18 | 0.11 | 0.09 |
| 0.5% HEC | 20 | 0.10 | 0.08 |
| | 0 | 0.36 | 0.20 |
| | −10 | 0.51 | 0.32 |
| | −18 | 1.05 | 0.46 |
| 1% HEC | 20 | 0.94 | 0.50 |
| | 0 | 3.74 | 1.07 |
| | −10 | 7.59 | 1.52 |
| | −18 | 13.6 | 1.99 |
| 2% HEC | 20 | 18.77 | 3.37 |
| | 0 | 58.55 | 5.51 |
| | −10 | 99.8 | 6.87 |
| | −18 | 153.0 | 8.12 |

TABLE 7

Performance of NCC at various concentrations

| Thickener | Temp (° C.) | Viscosity (Pa · s) at at γ = 0.13 $s^{-1}$ | at γ = 20 $s^{-1}$ |
|---|---|---|---|
| 0.5% NCC | 20 | 0.04 | 0.006 |
| | 0 | 0.05 | 0.01 |
| | −10 | 0.05 | 0.02 |
| | −18 | 0.06 | 0.03 |

TABLE 7-continued

Performance of NCC at various concentrations

| Thickener | Temp (° C.) | Viscosity (Pa · s) at at $\gamma = 0.13\ s^{-1}$ | at $\gamma = 20\ s^{-1}$ |
|---|---|---|---|
| 1% NCC | 20 | 0.06 | 0.009 |
| | 0 | 0.07 | 0.02 |
| | −10 | 0.07 | 0.02 |
| | −18 | 0.08 | 0.04 |
| 2% NCC | 20 | 0.10 | 0.02 |
| | 0 | 0.10 | 0.04 |
| | −10 | 0.17 | 0.06 |
| | −18 | 0.11 | 0.08 |
| 5% NCC | 20 | 0.51 | 0.14 |
| | 0 | 1.10 | 0.23 |
| | −10 | 1.61 | 0.3 |
| | −18 | 2.45 | 0.38 |

TABLE 8

Performance of HEC with various concentrations of NCC

| Thickener | Temp (° C.) | Viscosity (Pa · s) at at $\gamma = 0.13\ s^{-1}$ | at $\gamma = 20\ s^{-1}$ |
|---|---|---|---|
| 0.2% HEC + 0.25% NCC | 20 | 0.12 | 0.04 |
| | 0 | 4.45 | 0.11 |
| | −10 | 0.96 | 0.15 |
| | −18 | 1.03 | 0.19 |
| 0.2% HEC + 0.5% NCC | 20 | 4.17 | 0.09 |
| | 0 | 5.19 | 0.15 |
| | −10 | 5.53 | 0.18 |
| | −18 | 6.01 | 0.24 |
| 0.2% HEC + 1% NCC | 20 | 7.45 | 0.15 |
| | 0 | 13.81 | 0.23 |
| | −10 | 28.66 | 0.31 |
| | −18 | 26.2 | 0.36 |
| 0.2% HEC + 2% NCC | 20 | 27.22 | 0.99 |
| | 0 | 28.21 | 1.53 |
| | −10 | 27.18 | 1.92 |
| | −18 | 28.22 | 2.35 |

Referring to Table 6, HEC shows a significant increase in high shear rate viscosity with increasing concentration, leading to poor lift loss characteristics. As seen in Table 7, NCC alone performs better than HEC alone at high shear rates and, as seen in Table 8, combinations of 0.2% HEC with NCC desirably show both high viscosities at low shear and low viscosities at high shear. Most preferable are concentrations of NCC and HEC that result in a low shear viscosity of greater than 5 Pa·s and a high shear viscosity of less than 0.8 Pa·s.

This detailed description of the compositions and methods is used to illustrate certain embodiments of the present invention. It will be apparent to a person skilled in the art that various modifications can be made in the present composition and methods and that various alternate embodiments can be utilized without departing from the scope of the present application, which is limited only by the appended claims.

We claim:

1. An aircraft anti-icing composition comprising: a. a freezing point depressant; and b. a thickener comprising nanocrystalline cellulose.

2. The aircraft anti-icing composition of claim 1, wherein the freezing point depressant is a glycol solution in water.

3. The aircraft anti-icing composition of claim 2, wherein the glycol solution makes up at least 40% by weight of the anti-icing composition.

4. The aircraft anti-icing composition of claim 3, wherein the glycol solution makes up between 50 to 95% by weight of the anti-icing composition.

5. The aircraft anti-icing composition of claim 2, wherein the glycol solution is selected from the group consisting of ethylene glycol, propylene glycol, diethylene glycol, triethylene triol and 1,2-propane diol.

6. The aircraft anti-icing composition of claim 1, wherein the nanocrystalline cellulose is present in an amount of 0.25 to 5% by weight of the anti-icing composition.

7. The aircraft anti-icing composition of claim 6, wherein the nanocrystalline cellulose is present in an amount of 0.25 to 2% by weight of the anti-icing composition.

8. The aircraft anti-icing composition of claim 1, wherein the thickener further comprises one or more water soluble polymeric thickeners.

9. The aircraft anti-icing composition of claim 8, wherein the polymeric thickeners are present in an amount of 0.1 to 2% by weight of the anti-icing composition.

10. The aircraft anti-icing composition of claim 9, wherein the polymeric thickeners are present in an amount of 0.1 to 0.5% by weight of the anti-icing composition.

11. The aircraft anti-icing composition of claim 8, wherein the water soluble polymeric thickeners are selected from the group consisting of crosslinked polyacrylates, carboxypolymethylene, polysaccharides, associative synthetic polymers, carboxymethyl cellulose, hydroxyethyl cellulose and hydrophobically modified hydroxyethyl cellulose.

12. The aircraft anti-icing composition of claim 11, wherein the polysaccharides are xanthan gum, guar gum or carageenan.

13. The aircraft anti-icing composition of claim 1, further comprising one or more components selected from the group consisting of surfactants, corrosion inhibitors, anti-foamers, colorants and fire inhibitors.

14. The aircraft anti-icing composition of claim 1, further comprising a pH control agent selected from triethylamine and potassium hydroxide.

15. The aircraft anti-icing composition of claim 1, comprising nanocrystalline cellulose in an amount of 0.5% by weight of the anti-icing composition and hydroxyethyl cellulose in an amount of 0.2% by weight of the anti-icing composition as the thickener.

16. A process for the use of nanocrystalline cellulose in the manufacture of an aircraft anti-icing or de-icing composition, comprising the steps of:

a. providing an aircraft anti-icing or de-icing composition, and b. adding nanocrystalline cellulose to the anti-icing or de-icing composition.

17. the process of claim 16, further comprising the step of adding a freezing point depressant that is a glycol solution in water.

18. The process of claim 17, wherein the glycol solution is added to make up at least 40% by weight of the anti-icing composition.

19. The process of claim 17, wherein the glycol solution is added to make up between 50 to 95% by weight of the anti-icing composition.

20. The process of claim 17, wherein the glycol solution is selected from the group consisting of ethylene glycol, propylene glycol, diethylene glycol, triethylene triol and 1,2-propane diol.

21. The process of claim 16, wherein the nanocrystalline cellulose is added in an amount of 0.25 to 5% by weight of the anti-icing composition.

22. The process of claim 16, wherein the nanocrystalline cellulose is added in an amount of 0.25 to 2% by weight of the anti-icing composition.

23. The process of claim 16, wherein the nanocrystalline cellulose is added as a thickener together with one or more water soluble polymeric thickeners.

24. The process of claim 23, wherein the polymeric thickeners are present in an amount of 0.1 to 2% by weight of the thickening composition.

25. The process of claim 23, wherein the polymeric thickeners are present in an amount of 0.1 to 0.5% by weight of the thickening composition.

26. The process of claim 23, wherein the water soluble polymeric thickeners are selected from the group consisting of crosslinked polyacrylates, carboxypolymethylene, polysaccharides, associative synthetic polymers, carboxymethyl cellulose, hydroxyethyl cellulose and hydrophobically modified hydroxyethyl cellulose.

27. The process of claim 26, wherein the polysaccharides are xanthan gum, guar gum or carageenen.

28. The process of claim 23, wherein the thickener comprises 0.5% by weight of nanocrystalline cellulose and 0.2% by weight hydroxyethyl cellulose.

29. A process for the use of nanocrystalline cellulose in the manufacture of a thickening composition comprising of the steps of:

a. providing a water soluble polymeric thickener, and
b. adding nanocrystalline cellulose to the polymeric thickener in an amount of 0.1 to 1.0% by weight of the thickening composition.

30. The process of claim 29, wherein the polymeric thickeners are present in an amount of 0.1 to 5.0% by weight of the thickening composition.

31. The process of claim 29, wherein the water soluble polymeric thickeners are selected from the group consisting of crosslinked polyacrylates, carboxypolymethylene, polysaccharides, associative synthetic polymers, carboxymethyl cellulose, hydroxyethyl cellulose and hydrophobically modified hydroxyethyl cellulose.

32. The process of claim 31, wherein the polysaccharides are xanthan gum, guar gum or carrageenan.

33. The process of claim 29, wherein the thickener comprising 0.5% by weight of nanocrystalline cellulose and 0.2% by weight hydroxyethyl cellulose.

* * * * *